S. HUNT.
Muzzle-Loading Ordnance.
No. 3,358.
Patented Nov. 24, 1843.
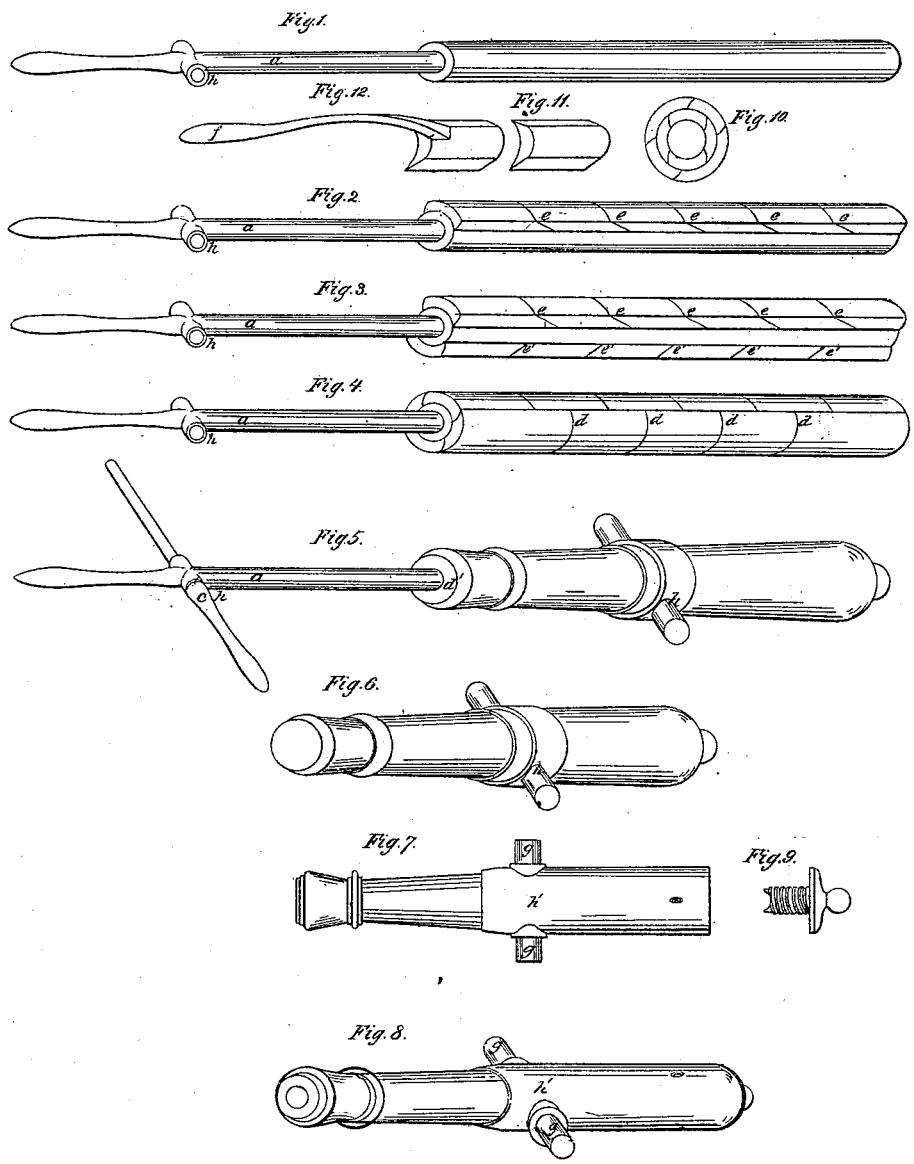

UNITED STATES PATENT OFFICE.

SALMON HUNT, OF WOLCOTTVILLE, CONNECTICUT; SALMON HUNT ADMINISTRATOR OF SAID SALMON HUNT, DECEASED.

IMPROVEMENT IN THE METHOD OF MAKING WROUGHT-IRON CANNON.

Specification forming part of Letters Patent No. 3,358, dated November 24, 1843.

*To all whom it may concern:*

Be it known that I, SALMON HUNT, of Wolcotville, in the county of Litchfield and State of Connecticut, administrator of the estate of the late SALMON HUNT, of Wolcottville, aforesaid, deceased, do hereby declare that the following is a full and exact description of the manner of constructing wrought-iron cannon invented by the said SALMON HUNT, deceased, reference being had to the annexed drawings, making a part of this specification, in which—

Figure 1 is a perspective view of a forming-bar. Fig. 2 is a view of the first course of plates to be welded thereto. Fig. 3 is a view of the second tier of plates welded on. Fig. 4 is a view of the same having the third and fourth tiers put on. Fig. 5 is a view of the forged gun with solid cascabel and banded trunnions. Fig. 6 is a view of the forged gun complete with the handle removed. Fig. 7 is a view of the finished gun with screw-cascabel and welded trunnions. Fig. 8 is a view of the same with solid cascabel. Fig. 9 is a view of the screw-cascabel. Fig. 10 is a cross-section of the gun, showing the laminal form and position of laps. Fig. 11 is a view of the plates before being put on. Fig. 12 is a view of the same having a handle to weld on with.

The nature of said invention consists in forging a gun or piece of ordnance by welding to a center rod, called a "forming-bar," a succession of plates so prepared and beveled at their edges as to form longitudinal and transverse laps with each other, and so placed in the formation of the gun as to make the grain of the iron to be in a transverse or nearly transverse direction to its length around the same.

To enable others skilled in the art to make said gun, I will proceed to describe the mode of effecting the same.

Fig. 1 is a round bar of iron, (if for a six-pounder,) to be about five inches in diameter, and of the length nearly of the gun when finished. The same is intended to be bored out when so finished.

*a a a a a*, Figs. 1 to 5, represent the handle, being of less diameter than the forming-bar, but making a part of the same, and having an eye at *b b b b b*, Figs. 1 to 5, to receive a cross-bar, *c*, Fig. 5, the same to be cut from the gun, when forged, at the part *d'*, Fig. 5, and to be of any desirable length for the convenience of managing the piece while forging the same.

Fig. 2 shows the first tier or course of plates welded to one side of the forming-bar representing the longitudinal laps of the same at *e e e e e*. Fig. 3 represents a second tier of plates put upon the opposite side of the forming-bar, as at *e' e'*. Fig. 4 represents two additional tiers of plates welded to the remaining two sides of the forming-bar in such a manner as to terminate the longitudinal laps or to "break joints," as it is denominated, between laps of the first two courses, as shown at *d d d d*, Fig. 4, thus completing a full course of plates around and extending the whole length of the forming-bar. Another similar course is then to be added or piled upon the courses first welded, taking care that the laps of the new courses terminate between the laps of the preceding courses, and so continue to add as many courses as will enlarge the diameter of the mass of metal to the size required, in which operation judgment is to be exercised as to the best thickness and consequent number of the plates to correspond to the different diameters of the piece to be made.

Fig. 10 shows a cross-section of the laminal formation and the position of the laps. Fig. 11 shows a prepared plate bent into a segment of a circle and beveled at the edges to form the laps. The grain of the iron should be transverse or nearly so throughout the length of the piece. Fig. 12 is a view of the same as Fig. 11, but having a handle at *f* welded to the plate for the convenience of heating and welding the same to the main part of the gun. Fig. 6 represents the gun forged complete, having the forming-rod detached and ready for boring out.

The trunnions may be welded on, as shown at *g g*, Figs. 7 and 8, or they may be shrunk on with a band, as shown at *h h*, Figs. 5 and 6. The breech of the gun may be solid, as shown at Figs. 5, 6, and 8, or it may have a screw-cascabel, as shown at Figs. 7 and 9.

If upon a longer trial of this kind of a gun an objection should be found to exist on account of the softness of the metal, I hereby declare it was in contemplation by the late SALMON HUNT to case-harden the inside of the same.

Having thus described the particular mode as practiced by the late SALMON HUNT in forging pieces of ordnance by a laminal formation of separate plates, having the grain of the iron in a direction transversely or nearly transversely to the piece instead of being in the direction of its length, I proceed to say that the length and number of the plates, the number of layers consecutively laid on, may be varied to suit the judgment of the maker; also, that by cutting the plates into squares or parallelograms across or diagonally with the grain of the iron does not change the effect, it being susceptible of many changes in form without a change of effects, so that the equivalent strength of the iron is obtained by giving the direction to the grain above indicated.

What I claim as new, and desire to secure in Letters Patent, is—

The particular manner herein described and set forth of welding to a center rod (which is afterward to be bored out of the gun) a laminal succession of plates or billets of iron in such a manner as to give the direction of the grain of the iron transversely around the body of the gun, or nearly so, upon the principle and in the manner above set forth.

SALMON HUNT,
*Administrator of Salmon Hunt, deceased.*

Witnesses:
  THOS. W. HARVEY,
  H. A. HARVEY.